INVENTORS
HARRY J. KIPPS
BY Donald W. Canady
ATTORNEYS 3,692,650
CATHODIC PROTECTION SYSTEM
Harry J. Kipps, South Laguna Beach, and Thaddeus M. Doniguian, Laguna Beach, Calif., assignors to Signal Oil and Gas Company, Los Angeles, Calif.
Filed Aug. 24, 1970, Ser. No. 66,239
Int. Cl. C23f 13/00
U.S. Cl. 204—147                                                     10 Claims

ABSTRACT OF THE DISCLOSURE

A method and apparatus for cathodic protection of structures, such as well casing and pipe lines by the use of a pulsed voltage and continuous current. The width of the voltage pulses is sufficiently wide to permit acid ion conversion but not wide enough to permit undesirable chemical reactions. The pulse repetition frequency is made equal to the resonant frequency of the series circuit formed by the protected structure which acts as a cathode, the medium in which the structure is located, and an anode placed in the medium. The series circuit includes an inherent inductance between the anode and cathode and an inherent series capacitance known as the taffel double layer capacitance. By operating at the resonant frequency, maximum cathodic protection power is derived for a given input power. Further, the inductance between the anode and cathode causes a continuous current to flow after each voltage pulse has terminated.

BACKGROUND OF THE INVENTION

Field of the invention

This invention relates to an improved method and apparatus for cathodic protection of a structure, such as a well casing, pipe line, etc., and, more particularly, to a method and apparatus for providing a pulsed D.C. voltage and continuous current to the structure such that the cathodic protection is effected with a maximum efficiency and a minimum of overprotection.

Description of the prior art

The use of cathodic protection to prevent corrosion is well established for the protection of metal structures, such as well casings and pipe lines, that are buried in conductive soils. Cathodic protection is also used for the protection of the inner surfaces of tanks which contain corrosive solutions, as well as for the protection of submerged portions of ship hulls, pier structures, offshore platforms, and other offshore metal structures. It is well established that the cathodic protection can be accomplished either by the use of sacrificial anodes electrically grounded to the structure to be protected, or by the application of low voltage direct current from a power source. In the latter method, which is the method to which the present invention relates, steady direct current, halfwave rectified current, and pulsed direct current have all been used.

It has been well established that, when a cathodic protection current is applied to a circuit including the structure (cathode) to be protected and its associated anode, a layer of charge is formed at approximately 100 A. from the surface of the structure. This layer of charge is called a taffel double layer. This taffel double layer acts as a capacitor in series with the anode-cathode circuit. There is also an inherent inductance between the anode and cathode of the protective circuit. Therefore, in effect a series LC circuit is formed between the anode and cathode of the cathodic protection circuit.

There are several problems which occur in prior art cathodic protection systems. One of the problems is overprotection which occurs when current greater than is necessary for cathodic protection is applied to the structure to be protected. Along with the desired chemical reactions which inhibit corrosion, other superfluous chemical reactions occur which decrease the efficiency of the system.

Another problem occurring in the prior art is the extremely long time required to polarize the structure to be protected, such as a pipe. Polarization is the building up of the taffel double layer along the surface of the pipe. Until a particular portion of the pipe is polarized, this portion is not protected by the cathodic protection current. The current in effect shorts back to the anode at the point where the polarization of the pipe ceases.

Still another problem in the prior art is the effects of hydrogen reduction due to overprotection. When the pipe-to-soil electrochemical potential reaches a certain level, hydrogen ions are forced from the soil through the taffel double layer and into the pipe. This action can cause severe consequences, such as pipe cracking in high strength steel pipes or the explosion of protective coatings and wraps on the pipes.

Still another problem occuring in the prior art is the mutual interference of cathodic protection systems when several protected structures are located and adjacent to each other. It has been found, for instance, in offshore drilling where well casings are located ten to twelve feet apart that the cathodic protection of each well casing interferes with the protection of its adjacent well casings, such that all of the well casings are insufficiently protected.

SUMMARY OF THE INVENTION

The present invention is an improved cathodic protection system which uses a short pulsed D.C. voltage and a continuous direct current. The pulse width of the voltage pulses is selected such that it is wide enough to permit the necessary acid ion conversion but is short enough so that the aforementioned undesirable chemical reactions do not take place. The frequency of pulse repetition is chosen to be equal to the resonant frequency of the series circuit of the capacitance of the taffel double layer and the inductance between the anode and the cathode structure. The voltage amplitude is selected to give a maximum throw down the pipe in order to effect polarization as quickly as possible. Throw is the distance from the point at which current is supplied to the structure to the point at which the current shorts back to the anode.

It is therefore the primary purpose of this invention to provide a cathodic protection system for protecting structures where conditions are unfavorable to the success of the prior art impressed current cathodic protection systems.

Another object of this invention is to control the protective current so that hydrogen reduction is eliminated and damage to protective coatings and wraps of the structures is minimized or eliminated.

It is a further object of this invention to control the pulse width of the protective voltage pulse such that there is sufficient time for the occurrence of desired electrochemical reactions but insufficient time for the occurrence of undesirable electrochemical reactions.

It is also the object of the invention to select a pulse repetition frequeny which is the resonant frequency of the series circuit formed by the structure to be protected which acts as a cathode, the medium in which the structure is located, and the taffel double layer capacitance. This circuit is hereinafter referred to as the anode-cathode circuit.

Another object of this invention is to obtain maximum cathodic protection power for a given input power by operating the protection system at the resonant frequency of the anode-cathode circuit, since at the resonant frequency there is no power loss due to reactive impedance.

Still another object of this invention is to provide improved cathodic protection by the use of voltage pulses but with a continuous current in the anode-cathode circuit whereby the continuous current and pulsed voltage provide constant cathodic protection without the undesirable effects of overprotection which would be caused by a continuous voltage.

DESCRIPTION OF THE PREFERRED EMBODIMENT

Figure 1:
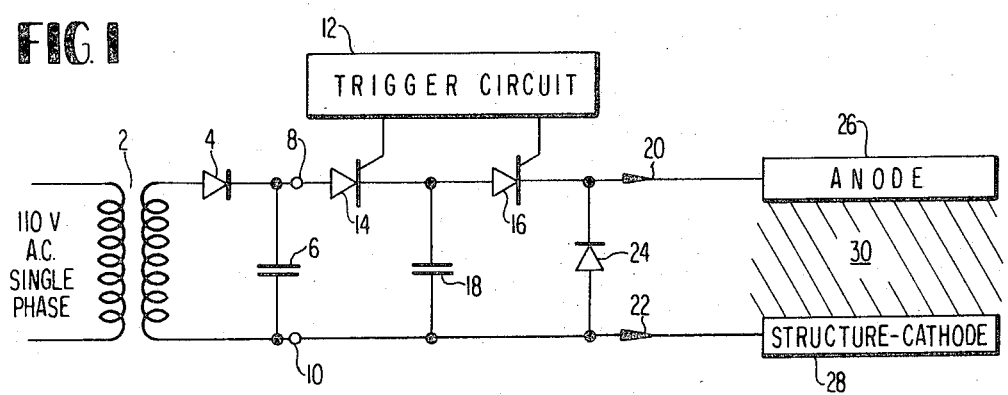
FIG. 1 is a circuit diagram of a preferred embodiment of this invention using a single phase A.C. power supply.

The corrosion of metal on the surface of a buried pipe involves basically two companion chemical reactions. In the first reaction, the metal at the pipe surface corrodes to form a metal oxide and thereby releases electrochemical energy. In the second reaction, acid ions in the soil adjacent to the metal surface accept the electrochemical energy released by the corrosion reaction to produce hydrogen gas. The corrosion reaction will not proceed unless acceptors, such as acid ions, can be found for the released electrochemical energy. By the application of cathodic protection, the acid ions absorb electrical energy rather than accepting electrochemical energy from the corrosion reaction, and thus the corrosion reaction is inhibited.

In addition to the acid ion reaction, other energy absorbing reactions which contribute very little, if any, to the corrosion inhibition occur when a cathodic protection system is applied to a buried structure. Energy must be supplied to all participating reactions in amounts proportionally necessary to achieve a desired amount of inhibition in the corrosion reaction. As the energy requirement ratio between the other reactions and the acid ion reaction increases, so does the inefficiency of the system.

Ideally, cathodic protection requires inputs of the protecting current uniformly along the surface to be protected. However, as a practical matter, electrical inputs must be confined to a finite number of locations along the surface to be protected. Since the current is applied to a finite number of points, there is an excess of electrical energy at and near these points which ordinarily causes excess chemical reactions resulting in unwanted loss of the protective current. In well casing protection, for instance, the input must be applied at the well head. Therefore, it can be expected that ordinarily there would be excess chemical reactions close to the well head and insufficient energy would be left to give proper protection to the casing at locations far removed from the well head.

In cathodic protection systems, it has been found that electrical energy applied to the protected structure, which functions as a cathode, takes the shortest path back to the anode of the system. Until a sufficient amount of polarization occurs along the metal surface, the electrical energy applied to the pipe line or well casing will not throw down the pipe. This shorting to the anode causes additional unnecessary chemical reactions.

The use of a pulsed D.C. voltage in a cathodic protection system permits the elimination of the undesirable chemical reactions without sacrificing any of the desired chemical reactions. In fact, the pulsed D.C. voltage enhances the desired chemical reactions.

There are several extremely important factors which must be considered when designing a cathodic protection system using a pulsed D.C. voltage. First, the pulse width of the voltage must be such that it allows sufficient time to cause acid ion conversion but provides an insufficient time for the undesired chemical reactions to take place. The optimum pulse width is normally between 7 and 60 $\mu$sec.

Second, the frequency of the pulses must be equal to the resonant frequency of the anode-cathode circuit. The impedance of this circuit is a function of the taffel double layer capacitance and the inductance between the anode and cathode. The taffel double layer and the inductance are in turn a function of both the type and condition of the structure to be protected and also of the medium in which the structure is placed. By using the resonant frequency, the loop impedance of the cathode-anode circuit is a pure relatively low resistance.

Operation of the anode-cathode circuit at its resonant frequency offers two distinct advantages over the prior art. This is the essence of the present invention. The first advantage is that, by operating at the resonant frequency, the reactive impedance of the anode-cathode circuit is zero. Therefore, for a given input power maximum cathodic protection power is derived since there is no power loss due to reactive impedance. The second advantage is utilization of the inherent inductance between the anode and cathode to maintain a continuous current in the anode-cathode circuit after the termination of the voltage pulse. This permits continuous cathodic protection betwen voltage pulses without the undesirable overprotection.

A third factor which is considered in a D.C. pulse cathodic protection system is the voltage of the pulse. The use of high voltages will permit the pulse throw to be extended down the pipe, thereby achieving rapid polarization. The rapid polarization is an important consideration since it prevents the shorting of current to the anode and the resulting unnecessary chemical reactions. It is important to note again that cathodic protection does not occur beyond the point of polarization, and, therefore, it is important to polarize the structure as quickly as possible.

In FIG. 1, an alternating current is supplied through transformer 2 to rectifier 4. Ripple is removed from the current by filter capacitor 6, thereby providing steady direct current at terminals 8 and 10.

Trigger cicruit 12 is an asymmetric multivibrator which gates ON SCR's 14 and 16. Power capacitor 18 supplies the voltage pulse to the anode cathode circuit of the structure to be protected via terminals 20 and 22. The anode-cathode circuit includes anode 26, medium 30, and the protected structure 28 which acts as the cathode. Diode 24 is a feedback clipper diode which is connected across the anode-cathode circuit.

In the operation of FIG. 1, a constant direct current is supplied to terminals 8 and 10 by transformer 2, rectifier 4, and filter capacitor 6. Asymmetric multi-vibrator 12 gates on SCR 14 such that current flows from terminal 8 to charge power capacitor 18. After power capacitor 18 has become charged, trigger circuit 12 gates on SCR 16 and power capacitor 18 discharges through the anode-cathode circuit of the structure to be protected. The frequency of trigger circuit 12 is the resonant frequency of the anode cathode circuit. This frequency must be selected in accordance with the type of structure to be protected, e.g., pipe, well casing, or ship hull, and the medium in which the structure is located. The voltage pulse width is determined by the RC time constant of capacitor 18 and the resistance of the anode-cathode circuit of the device to be protected. The capacitance of capacitor 18, and thereby the pulse width, is selected such that the pulse width is sufficient to allow time for acid ion conversion but is insufficient for other undesirable chemical reactions to occur.

Feedback clipper diode 24 permits current to flow through the anode-cathode circuit between successive voltage pulses. This occurs because of the inductance which is inherent in the anode-cathode circuit. Since the current through an inductor cannot change instantaneously, after the end of each voltage pulse the current continues to flow in the anode-cathode circuit using feedback clipper diode 24 as the return path. There is, therefore, continuous current in the anode-cathode circuit.

It is the cathodic protection achieved by this combination of voltage pulses and steady current which is the essence of the instant invention.

Figure 2:
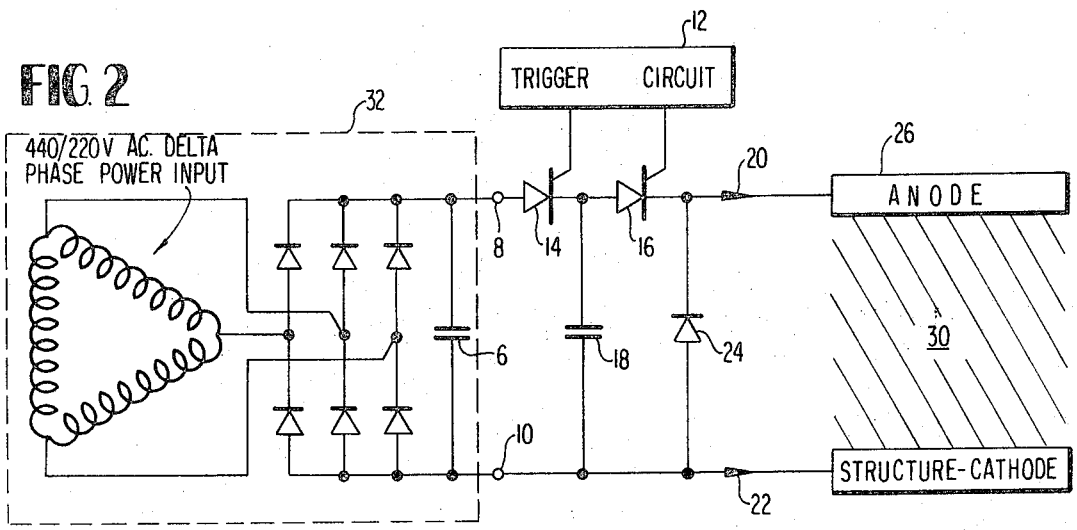
FIG. 2 is a circuit diagram of the preferred embodiment of this invention using a three phase delta A.C. power supply.

FIG. 2 is the same as FIG. 1 except that the D.C. current is supplied to terminals 8 and 10 from a three phase delta power supply system 32.

Figure 3:
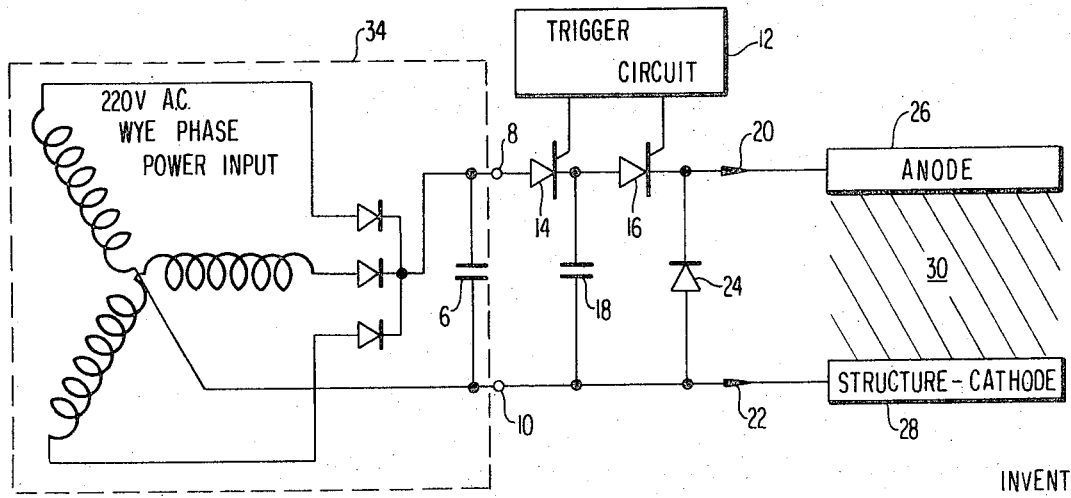
FIG. 3 is a circuit diagram of the preferred embodiment of this invention using a three phase "Y" A.C. power supply.

FIG. 3 is similar to FIG. 1 except that the D.C. current is supplied to terminals 8 and 10 from a three phase "Y" power system 34.

While the invention has been particularly shown and described with refence to the preferred embodiments thereof, it will be understood by those skilled in the art that various changes in form and details may be made therein without departing from the spirit and scope of the invention.

We claim:

1. A method of corrosion protection for a structure in a medium comprising:
   (a) placing an anode in the medium in a position to form an anode-cathode series circuit including said anode, said medium, and said structure to be protected, said structure to be protected acting as a cathode, wherein said series circuit further includes an inherent inductance between the anode and cathode and an inherent taffel double layer capacitance; and
   (b) generating a series of voltage pulses across said anode-cathode series circuit at a frequency to maximize the potential throw along said structure.

2. The method of claim 1 further comprising selecting a pulse width of from 7 to 60 microseconds to effect acid ion conversion but not permit undesired chemical reactions.

3. The method of claim 2 further comprising providing a current path in parallel with said anode-cathode series circuit whereby current will flow, for a period after the termination of each voltage pulse, in the circuit comprising the current path and the anode-cathode circuit.

4. A method as defined in claim 1, further comprising selecting the frequency of said pulses to be equal to the resonant frequency of said anode-cathode series circuit.

5. A cathodic protection system comprising:
   (a) a structure to be cathodically protected and acting as a cathode, said structure being immersed in a conductive medium;
   (b) an anode immersed in the conductive medium and forming a series circuit with said structure and the medium;
   (c) electric pulse generating means for supplying spaced unidirectional pulses to said series circuit; and
   (d) unidirectional current conducting means connected in parallel with said series circuit and poled for conducting unidirectional current through said series circuit in the same direction as said unidirectional pulses during the spaces between said pulses.

6. A cathodic protection system as defined in claim 5 wherein said pulse generating means further comprises means for supplying said pulses at the resonant frequency of said series circuit, said unidirectional current being caused by the inherent inductance of said series circuit.

7. A cathodic protection system as defined in claim 5 wherein said unidirectional current conducting means comprises a diode.

8. A method of cathodically protecting a structure immersed in a conductive medium, the structure acting as a cathode comprising the steps of:
   (a) applying spaced unidirectional electric pulses to an anode immersed in the medium, the anode, conductive medium and structure forming a series circuit; and
   (b) providing in parallel with the series circuit a unidirectionally conducting current path for conducting current through the series circuit in the same direction as the unidirectional electric pulses.

9. A method as defined in claim 8 further comprising applying the spaced pulses at a frequency equal to the resonant frequency of the series circuit.

10. A method as defined in claim 8 wherein the current flowing in the unidirectionally conducting current path is an inductive current which flows during the spaces between the pulses, the inductive current being caused by the inherent inductance of the series circuit.

References Cited

UNITED STATES PATENTS 3,242,064   3/1966   Byrne _____ 204—196

FOREIGN PATENTS 657,392   9/1951   Great Britain _____ 204—147

TA-HSUNG TUNG, Primary Examiner

U.S. Cl. X.R.

204—196